(12) United States Patent
Chandler et al.

(10) Patent No.: US 6,225,596 B1
(45) Date of Patent: May 1, 2001

(54) PORTABLE WELDING UNIT

(75) Inventors: Thomas D. Chandler, Coon Rapids; John C. West, Eagan, both of MN (US)

(73) Assignee: Century Mfg. Co., Minneapolis, MN (US)

( * ) Notice: Subject to any disclaimer, the term of this patent is extended or adjusted under 35 U.S.C. 154(b) by 0 days.

(21) Appl. No.: 08/618,968

(22) Filed: Mar. 20, 1996

(51) Int. Cl.$^7$ .................................................... B23K 9/10
(52) U.S. Cl. ................................... 219/130.1; 219/137.71
(58) Field of Search .............................. 219/130.1, 125.1, 219/130.31, 130.32, 130.33, 133, 134, 136, 137.2, 137.71, 137 PS, 98; 429/90, 100

(56) References Cited

U.S. PATENT DOCUMENTS

| | | | |
|---|---|---|---|
| 2,866,076 | * 12/1958 | Aversten | 219/98 |
| 4,590,357 | * 5/1986 | Winkler | 219/130.1 |
| 4,705,934 | * 11/1987 | Winkler | 219/130.1 |
| 4,801,780 | * 1/1989 | Hayes | 219/130.1 |
| 5,086,208 | * 2/1992 | Habermann | 219/130.1 |
| 5,233,159 | * 8/1993 | Day | 219/130.1 |
| 5,250,786 | * 10/1993 | Kikuchi et al. | 219/130.32 |
| 5,372,898 | * 12/1994 | Atwater et al. | 429/90 |
| 5,410,126 | * 4/1995 | Miller et al. | 219/130.1 |
| 5,437,939 | * 8/1995 | Beckley | 429/100 |

FOREIGN PATENT DOCUMENTS

2650522 * 5/1978 (DE) ................................ 219/125.1

* cited by examiner

Primary Examiner—Clifford C. Shaw
(74) Attorney, Agent, or Firm—Dorsey & Whitney LLP (57) ABSTRACT

A portable welding unit comprising a housing. The housing contains a first battery and a second battery connected in series. Each of the batteries is a sealed, non-spillable battery. Each battery has a positive terminal and a negative terminal. The welding unit has a first clamp electrically connected to the positive terminal of the first sealed, non-spillable battery. The first clamp extends outside the housing and is adapted to be connected to a ground of an object to be welded. A welding gun is electrically connected to the negative terminal of the second sealed, non-spillable battery. The welding gun extends outside the housing. A wire feed mechanism is located in the housing and is connected to the battery for extending wire through the welding gun. A spool of consumable electrode wire is rotatably connected to the housing. This wire is supplied to the welding gun via the wire feed mechanism.

In operation, the user connects the first clamp to ground. Next, the user enables the unit so that power is supplied from the batteries contained in the housing. Once the unit is powered up and the gun trigger is activated, the wire electrode is supplied through the welding gun by the wire feed mechanism. The user may then begin welding.

34 Claims, 7 Drawing Sheets

PORTABLE WELDING UNIT

TECHNICAL FIELD

The present invention relates to a welder. In particular, the present invention discloses a welding unit which is self-contained and portable.

BACKGROUND OF THE INVENTION

Farmers, ranchers, and other people who work outside may have to perform light maintenance on equipment, fences, or other structures which may require the use of a welder. One of the problems in performing light maintenance outside with a welder is that there may be no readily accessible power source for powering the welder. To address this problem, currently there are some welders which are marketed as portable welders. These welders have a welding torch, a wire feeder, and two twelve volt wet cell batteries. However, these components are not enclosed in a housing.

These type of portable welders pose several problems to a user: (1) the user cannot conveniently transport the welding equipment; (2) because these welders use wet cell batteries, the user cannot store or position the welding unit in any position other than upright; and (3) the current welders are bulky.

First, a user cannot conveniently transport a welder which is not enclosed in a housing. In order for a user to transport these welders, the user must move the batteries separately from the welding torch and the wire feeder. Consequently, a welder which can be conveniently transported would be desirable.

Secondly, because welders use wet cell batteries, a user can only store the welder in an upright position. The batteries must always be in this position so that battery acid does not leak from them. Clearly, a welder which can be stored in any position would be desirable.

Also, current welders are bulky. They do not have a compact design. A compact design makes lifting and positioning a welder more convenient. Clearly, a portable welder having a compact design would be desirable.

SUMMARY OF THE INVENTION

The present invention discloses a portable welding unit packaged in a compact housing. The housing contains a first battery and a second battery connected in series. Each of the batteries is a sealed, non-spillable battery. Each battery has a positive terminal and a negative terminal. The welding unit has a ground clamp and cable electrically connected to the positive terminal of the first sealed, non-spillable battery. The ground clamp and cable extend from the housing and is adapted to be connected to a ground point of an object to be welded. A welding gun and cable are electrically connected to the negative terminal of the second sealed, non-spillable battery. The welding gun and cable extend from the housing. A wire feed mechanism is located in the housing and is connected to the battery for feeding wire through the welding gun. A spool of consumable electrode wire is rotatably connected to the housing. This wire is supplied to the welding gun via the wire feed mechanism.

In operation, the user connects the ground clamp to ground. Next, the user enables the unit so that power is supplied from the batteries contained in the housing. Once the unit is powered up and the gun trigger is activated, the wire electrode is supplied through the welding gun by the wire feed mechanism. The user may then begin welding.

The portable welding unit also has a recharging connection adapted to receive an adapter that allows the user to recharge the batteries. In one embodiment, this recharging connection allows for recharging at twelve volts (12V). Thus, in this embodiment, the batteries in the portable welding unit may be charged using an outlet in an automobile. This feature enhances the portability of the welding unit of the present invention.

One object of the present invention is to provide a portable, self-contained welding unit.

Another object of the present invention is to provide a compact portable welding unit.

A further object of the present invention is to provide a welding unit that can be recharged by connecting the unit to an automobile.

The above objects, advantages, and features of the present invention will become more apparent upon reference to the following description thereof with the appended drawings. However, before referring to the description and to the drawings, it is to be appreciated that the following description shows the presently preferred embodiments only. Accordingly, various modifications may be made to the invention without departing from the spirit and scope of the following described invention. It is to be further appreciated that to the extent like numerals are used in the various drawings, they describe like components.

DETAILED DESCRIPTION

Figure 1:
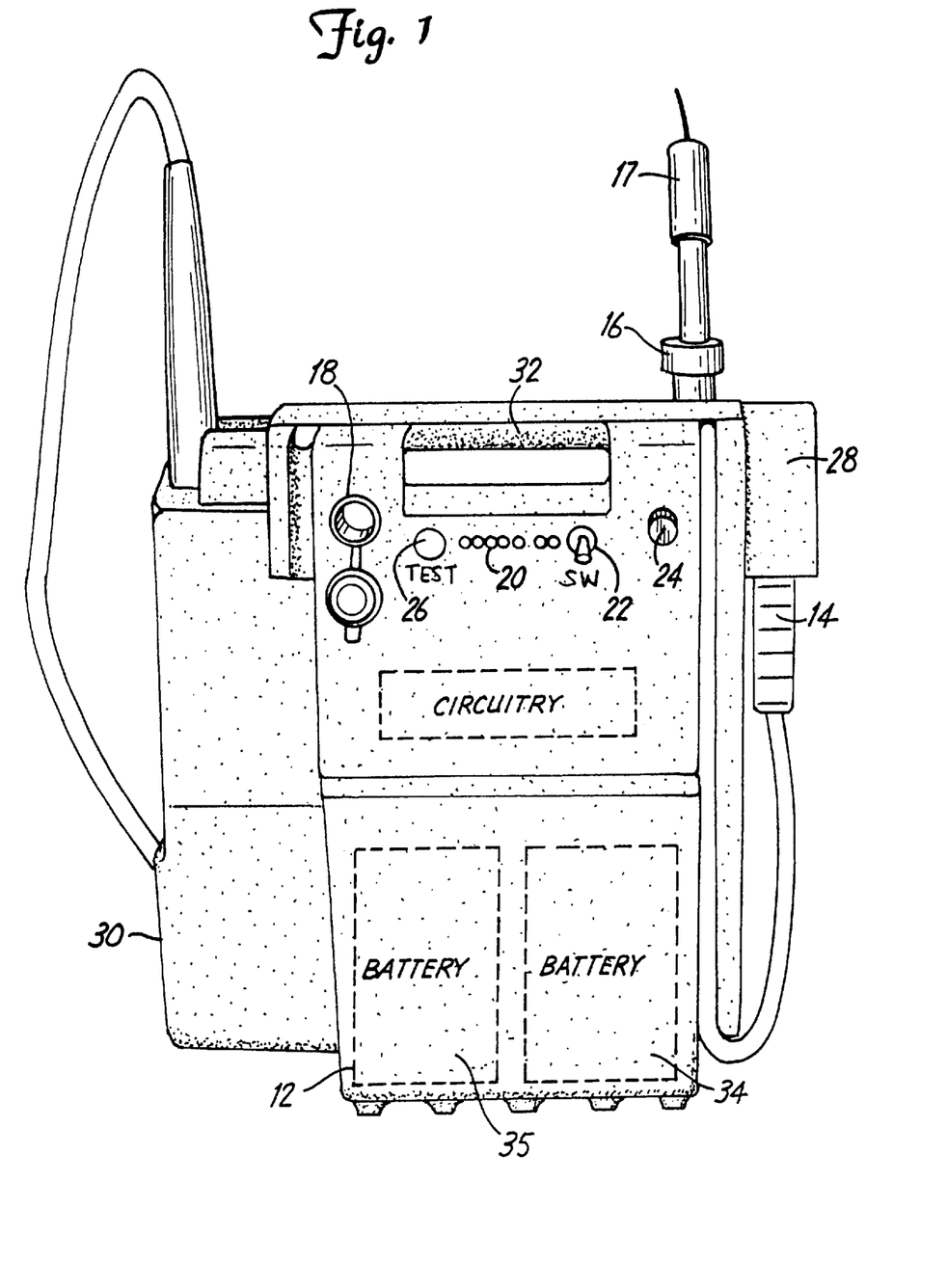
FIG. 1 shows a pictorial view of a portable welder of the present invention.

FIG. 1 shows a self-contained, portable welding unit 10 in accordance with the present invention. The welding unit or welder 10 comprises a housing 12, a first battery 34, a second battery 35, a ground clamp 14, and a welding gun 16 with a nozzle 17 which encloses a contact tube (not shown). In the front panel are a recharging connection 18, an output display 20, a power switch 22 having an "ON" and an "OFF" position, a visual indicator 23, wire speed control 24, and a tester button 26. The housing 12 is preferably constructed out of plastic. The housing 12 has a holster 28 (see FIG. 6) for receiving and storing the ground clamp 14, a removable cover 30 for enclosing a portion of the drive mechanism and a spool of consumable electrode wire (see FIG. 2), and a handle 32 for conveniently lifting and moving the welder 10.

Figure 6:
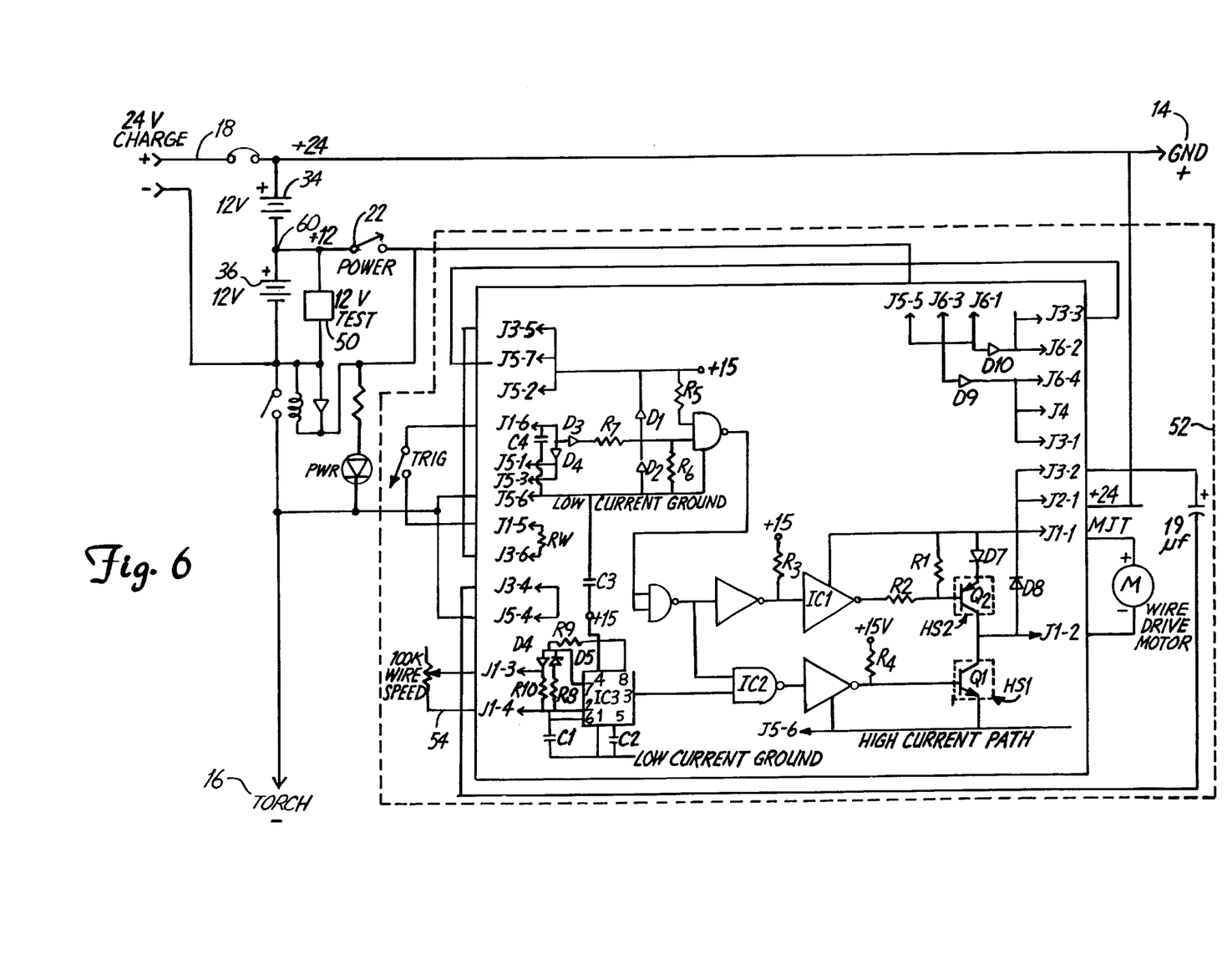
FIG. 6 shows a detail side view of the ground clamp holster for a portable welder of the present invention.

As shown in FIG. 6, inside the holster 28 is a non-conducting cylindrical protrusion 56. The ground clamp 14 is connected to or around this protrusion 56 when the unit is being stored. This holster with the protrusion 56 helps prevent accidental electrical contact with the clamp 14.

The housing 12 has a height 70, a length, 72 and a width 74. In the preferred embodiment, the housing has the following dimensions: a height of fifteen and one-half inches (15½ inches), a length of fifteen inches (15 inches), and a width of seven inches (7 inches). A housing 12 having the above dimensions is used to compactly store the batteries 34, 35, circuitry for the drive mechanism and circuitry for monitoring the batteries, portions of the ground clamp 14 and the welding gun 16, the recharging connection 18, the output display 20, the power switch 22, the wire speed control 24, and the tester button 26. This compact housing 12 enables the user via the handle 32 to conveniently transport the welder 10 for use in locations where there is no access to a power outlet.

However, the dimensions of the housing may be within the following ranges: the height 70 of the housing 12 may be between nine (9) inches and fifteen and one-half (15½) inches; the length 72 of the housing 12 may be between six (6) and fifteen (15) inches, and the width 74 of the housing 12 may be between three (3) and seven (7) inches.

As shown in FIG. 1, the first and second batteries 34, 35 are located in the housing 12. Each battery 34, 35 has a negative terminal and a positive terminal. In the preferred embodiment, each battery 34, 35 is a sealed, lead acid, twelve volt (12V) battery. These batteries 34, 35 are connected in series. Each of the batteries 34, 35 have a height, length, and width that makes it very compact. In the preferred embodiment, each battery has a height of 6.57 inches (167 millimeters), a length of 7.13 inches (181 millimeters), and a width of 2.99 inches (76 millimeters). In the preferred embodiment, a battery manufactured by Panasonic having a Model No. LCR-12V17CP is used. This battery has a rated capacity (20 hour rate) of seventeen ampere hours. Circuitry for (1) battery monitoring (which will be described later) and (2) speed control for the drive mechanism(which will be described later) is connected to the batteries 34, 35 and contained in the housing 12.

Figure 2:
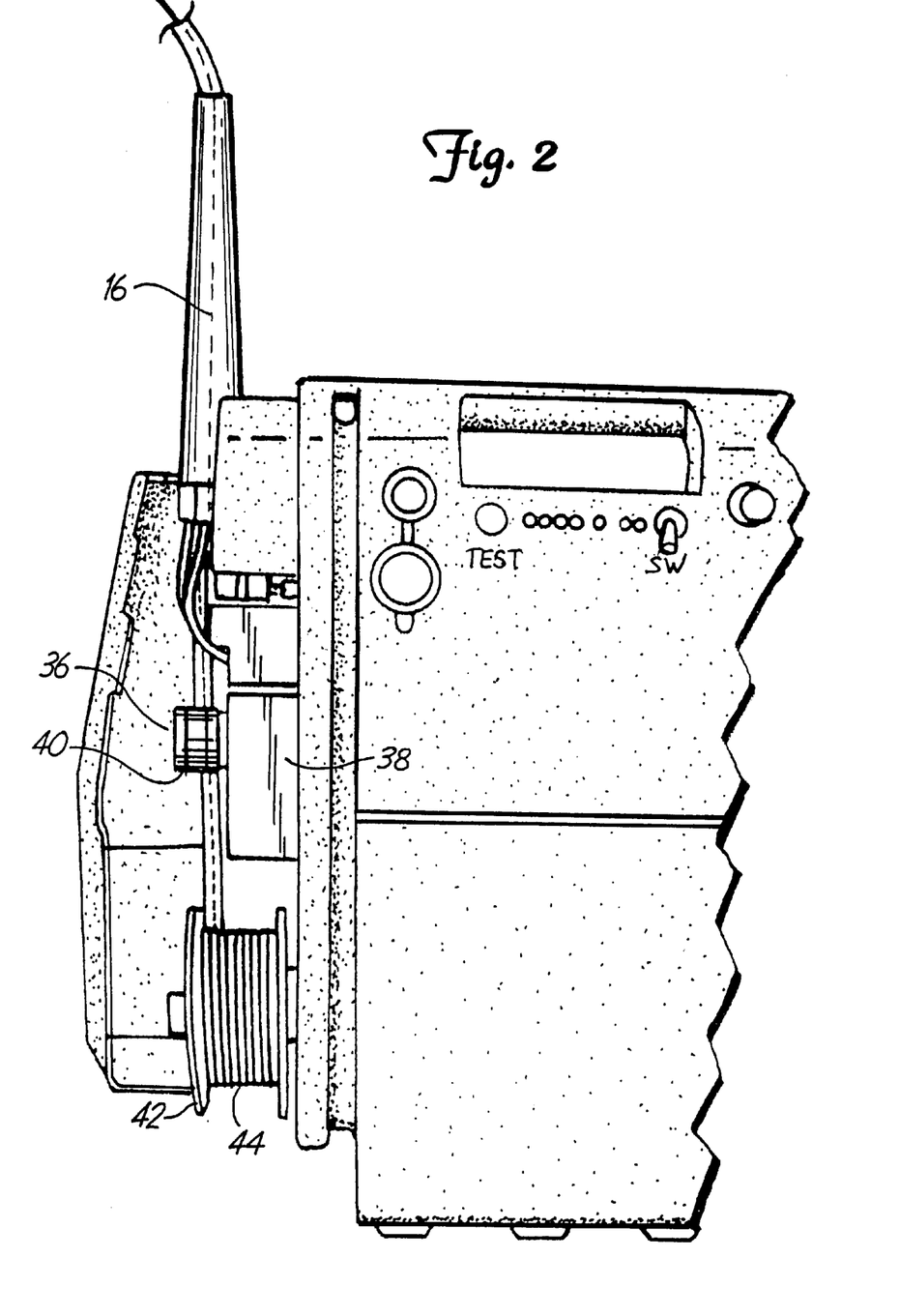
FIG. 2 shows a partial pictorial view of a portable welder of the present invention, with the cover for the wire feed mechanism removed.
Figure 3:
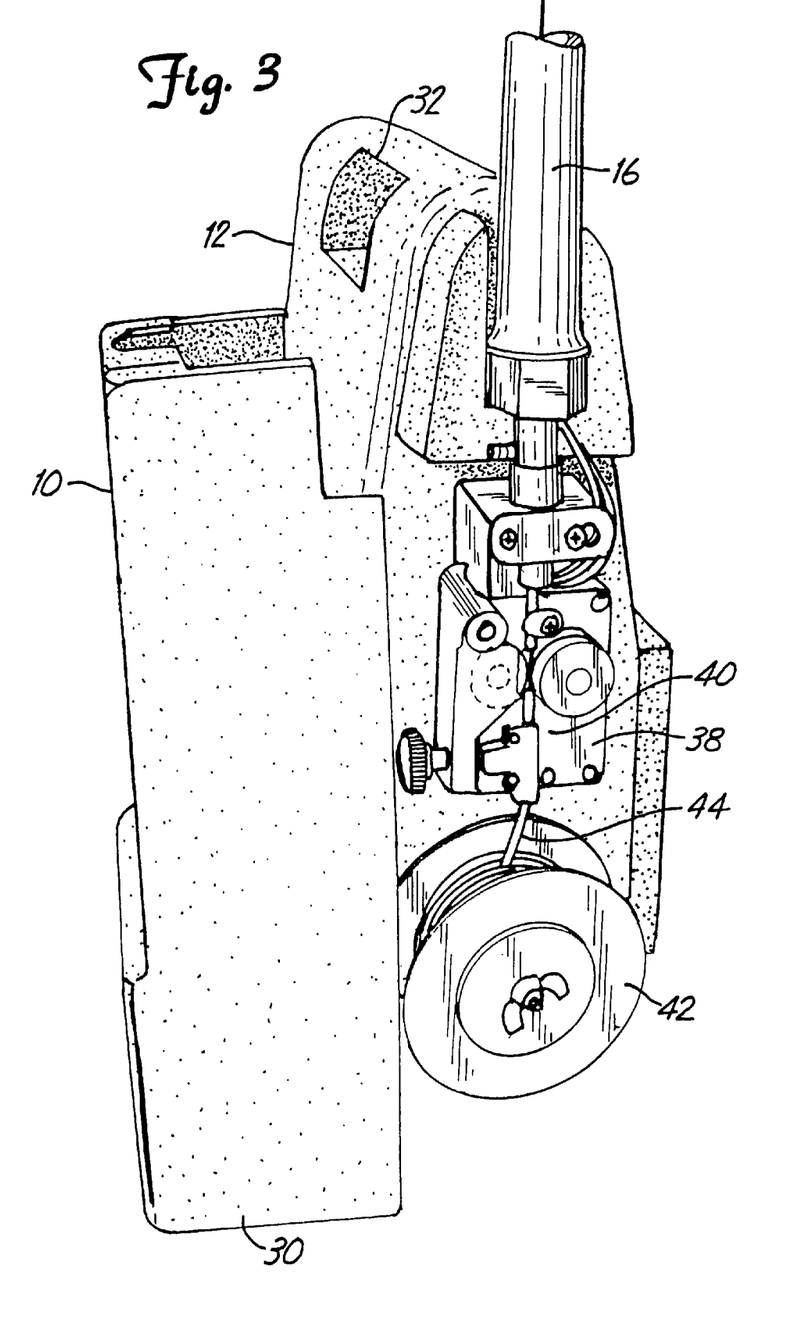
FIG. 3 shows an isometric left side view of the portable welder of the present invention.

Referring to FIGS. 2 and 3, the wire feed drive mechanism 36 of the portable welder 10 will be described. As shown in FIGS. 2 and 3, a drive mechanism 36 which comprises the drive motor 38 with grooved rollers 40, a storage spool 42 containing a consumable wire electrode 44, and a portion of the welding gun 16 are enclosed by the cover 30. The drive motor 38 is a direct current ("DC") motor with a gear reduction mechanism. The grooved rollers 40 have a wire tension adjustment 39. The DC motor 38 powers the grooved rollers 40, which cause the electrode wire 44 to be advanced and fed to the welding gun 16. The DC motor 38 of the present invention is preferably a variable speed motor. The user controls the speed at which the wire is supplied to the welding gun 16 by adjusting the wire speed control 24.

Continuing to refer to FIGS. 2 and 3, the welding gun 16 is a wire feed welding gun which has an internal bore for receiving the electrode wire 44. This electrode wire 44 is melted in the weld or at the work by an electric arc from power supplied through a conventional contact tube in the welding gun 16. It should be noted that in the preferred embodiment, the electrode wire 44 used with this welder 10 is flux electrode wire.

Figure 4:
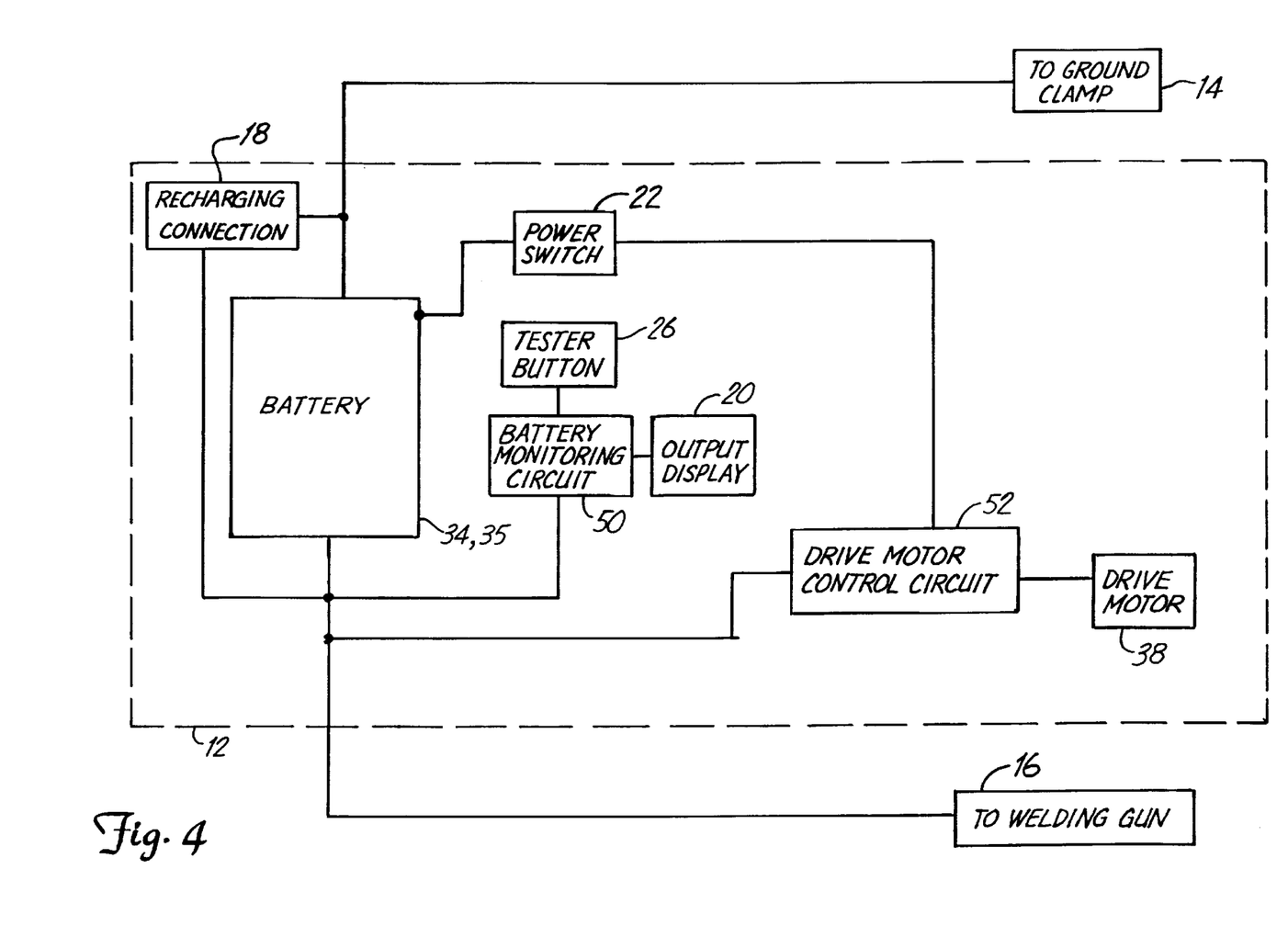
FIG. 4 shows a block diagram of the functional components of the present invention.

FIG. 4 is a block diagram illustrating the various functional elements in the portable welder 10 and their relationship to each other. As shown in FIG. 4, the ground clamp 14 and the welding gun 16 are connected across the battery pair 34, 35. The recharging connection 18 is configured to charge the batteries 34, 35, also by being connected across the battery pair 34, 35.

The battery pair 34, 35 is also connected to the battery monitoring circuit 50 and the drive motor control circuit 52.

The tester button 26 is connected to the battery monitoring circuit 50. This button 26 allows the user to test the charged/discharged condition of the batteries 34. The battery monitoring circuit 50 is also connected to the output display 20. This output display 20 will visually indicate the condition of the batteries 34, 35, both when the welder is being used or when the welder is not in use. This output display 20 will also visually indicate the condition of the batteries 34, 35 when they are being charged via the recharging connection 18.

Continuing to refer to FIG. 4, a solenoid 66 is interposed between the battery 34, 35 and the drive motor control circuit 52. The solenoid 66 applies a ground to the welding gun 16 and the drive motor control circuit 52. The drive motor control circuit 52 is connected to the drive motor 38.

Figure 5:
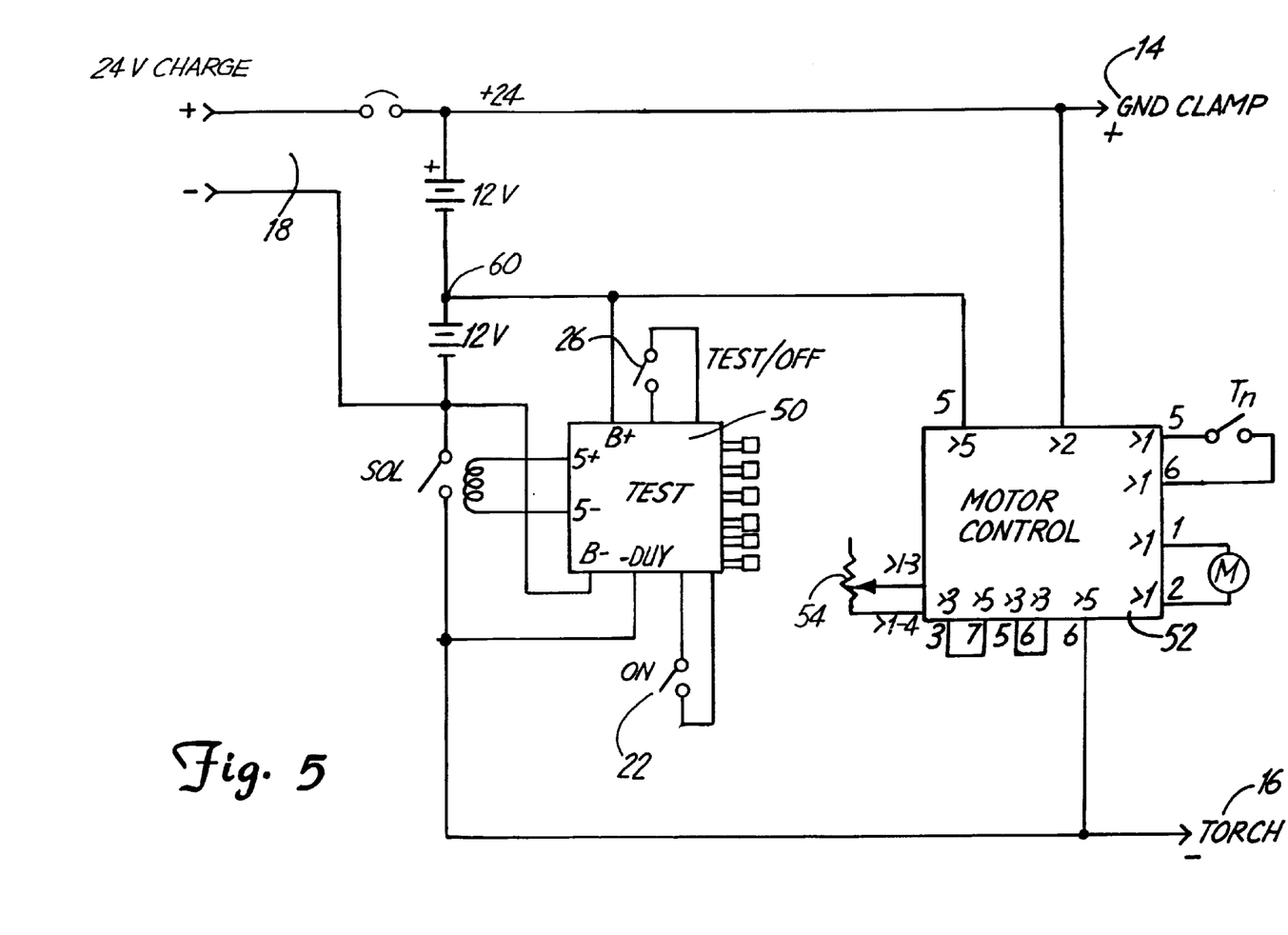
FIG. 5 shows a circuit diagram of the wire feed drive motor control circuit.

Next, turning to FIG. 5, a detailed implementation of circuitry 50, 52 of the portable welder 10 will be described. As shown in FIG. 5, the positive terminal of the first battery 34 is electrically connected to the ground clamp 14. The negative terminal of the second battery 35 is electrically connected to the welding gun 16 through the solenoid 66. Because of this polarity configuration of the ground clamp 14 and the welding fun 16 to the batteries 34, 35, only flux wire electrode may be used in this welder 10.

As shown in FIG. 5, the two twelve volt (12V) batteries 34, 35 are connected in series at node 60. The recharging connection 24 in the embodiment shown in FIG. 5 is configured for a twenty-four volt (24V) charge. This configuration allows both batteries 34, 35 to be charged.

Continuing to refer to FIG. 5, the battery monitoring circuit 50 is connected across the terminals of the second battery 35. It is configured to measure the voltage across only one of the batteries 34, 35. This configuration will provide the user with an accurate reading of the condition of both batteries 34, 35, because the batteries 34, 35 are connected in series. However, the portable welder 10 may be also designed so that the battery monitoring circuit 50 is connected across both batteries 34, 35.

The battery monitoring circuit 50 is a common multi-point power level detection circuit. A similar circuit is contained in the BOOSTER PAC® Model No. ES2500 portable starting unit manufactured by Century Manufacturing Co. in Bloomington, Minn.

Continuing to refer to FIG. 5, the drive motor control circuit 52 is connected to the positive and negative terminals of the second battery 34 via the power switch 22 and the solenoid 66 respectively. When the switch 22 is in the "ON" position, power is supplied directly to the drive motor control circuit 52.

Also, as shown in FIG. 5, the light emitting diode 90 serves as the visual indicator 23. When the switch is in the "ON" position, the visual indicator 23 will inform the user that the welding unit is powered up. Finally, the trigger 68 represents a trigger switch at the welding gun 16 for operating the welder 10. This design of circuit 52 is a conventional design for controlling the speed at which the drive motor 38 rotates. The speed control 26 located on the front of the housing 12 allows the user to manually control the motor speed. This control 26 is connected to a potentiometer 54 (see FIG. 5) which enables the user to control the rate at which the consumable electrode 44 is supplied to the welding gun 16.

It should be noted that the rate at which the wire 44 is supplied to the welding gun 16 determines the amount of current output by the welding gun 16. As the rate at which the wire is supplied is increased, the amount of current supplied increases because of the shorter arc. If wire 44 is supplied at a slower rate, then less current is supplied to the welding gun 16 because of a longer arc. The welder 10 is designed to supply current in the range of sixty amperes ("60 A") to over a one hundred thirty amperes ("130 A"). This range is possible due to the peak current supplying characteristics of the batteries 34, 35.

In operation, the user connects the ground clamp 14 to a ground. Next, the user turns the power switch 22 to the "ON" position. Once the power switch is turned on, the visual indicator 23 will indicate that the unit 10 has been powered up. Also, power is supplied directly to the drive motor control circuit 52 and the solenoid 66 is activated. Power is supplied to the welding gun 16 through the solenoid 66. Next, the user pulls the trigger 68 on the welding gun 16. Upon pulling the trigger 68, the drive motor control circuit 52 applies variable power to the drive motor 38, which causes the electrode wire 44 to be fed to the welding gun 14. The speed of the drive motor 38 is controlled by the potentiometer 54. It should be noted that regardless of the orientation of the welding unit 10, the welder 10 is operable.

When the tester button 26 is activated, the testing circuit 50 via the output display 20 indicates to the user the condition of the batteries 34.

When the output display 20 indicates that the batteries 34 need to be charged, an adapter (not shown) is connected to the recharging connection 18 to recharge the batteries. Once the batteries are fully charged, this condition is indicated via the output display 20.

In another alternate embodiment of the welder 10, the recharging connection 18 is designed for 12V charging. There is an advantage to having a 12V recharging connection 18. A 12V recharging connection would enable the user to charge the welder 10 through the cigarette lighter connection in a vehicle. This feature makes the portable charger even more convenient in remote sites where there is no access to a power outlet because the use of the welder is not limited to the life of the batteries 34, 35. Rather, the welder 10 may be used as long as the batteries 34, 35 may be charged from a nearby vehicle.

Figure 7:
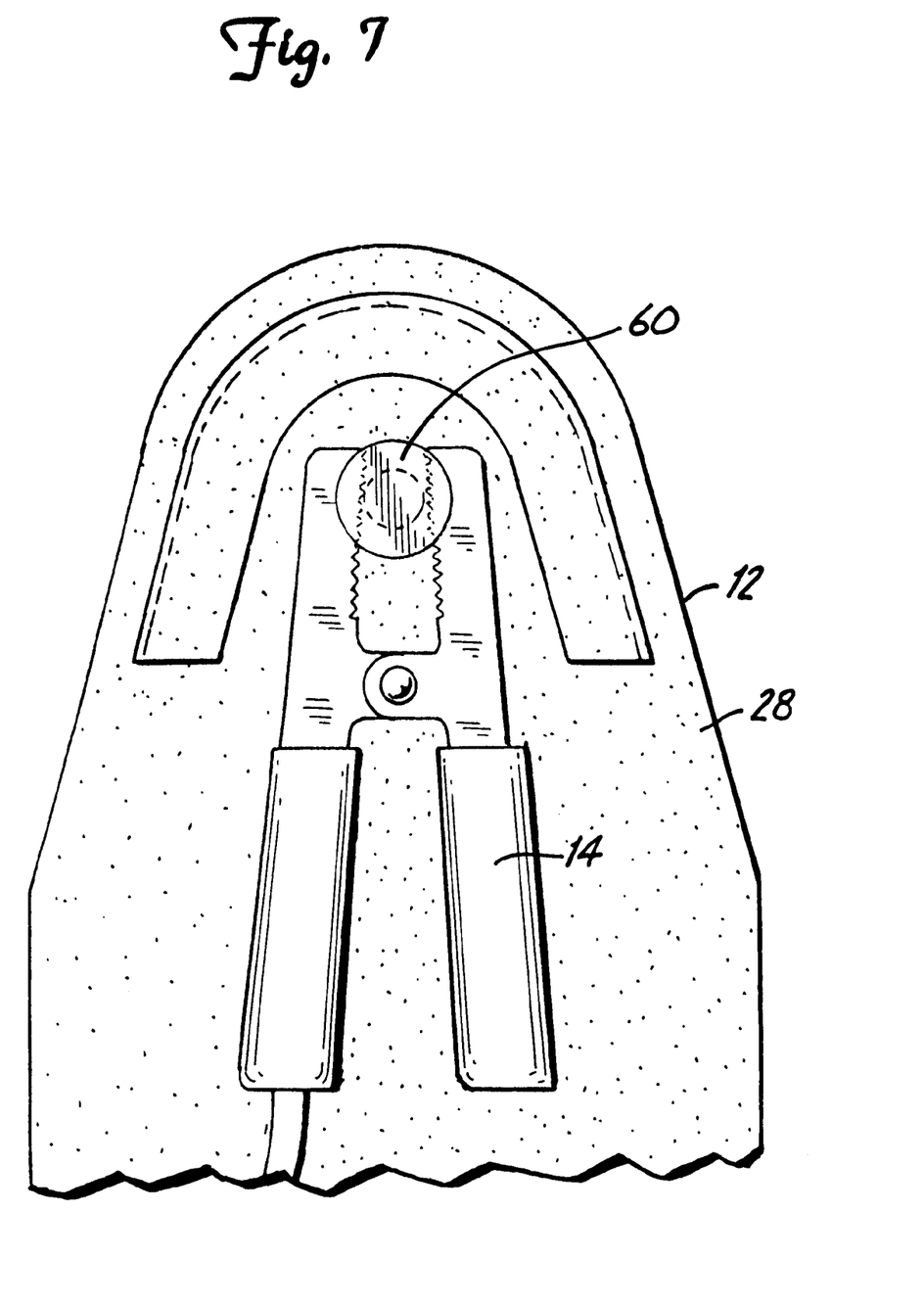
FIG. 7 shows a circuit diagram for the twelve volt recharging arrangement.

FIG. 7 shows a circuit diagram for implementing a 12V recharging connection 18. The solenoid 66 is interposed between the first and second batteries 34, 35 at nodes 92, 94. Diodes 96, 99 are interposed between node 92 and the node connecting the ground clamp 14 to the positive terminal of the first battery 34. Similarly, diodes 97, 98 are interposed between node 94 and the node connecting the welding gun 16 to the negative terminal of the second battery 35. During the operation of the welder 10, the solenoid 66 is activated, thereby in a closed position.

In operation, a 12V charging adapter is connected to the 12V recharging connection 18. When charging the batteries 34, 35, the solenoid 66 is deactivated, thereby isolating the batteries 34, 35. When the solenoid 66 is deactivated, the solenoid 66 is open. (It should be noted that during the operation of the welder 10 for welding, the solenoid is activated. When the solenoid 66 is activated, it is in a closed position) The diodes 96, 97, 98, 99 only allow current to flow in one direction, effectively, charging each of the batteries 34, 35 in parallel.

In another alternate embodiment of the welder 10, the positive terminal of the first battery 34 is electrically connected to the welding gun 16. The negative terminal of the second battery 35 is electrically connected to the ground clamp 14 through the solenoid 66. The advantage of this configuration is that it allows the user to use solid electrode wire 44.

While preferred embodiments of the present invention have been described, it should be appreciated that various modifications may be made by those skilled in the art without departing from the spirit and scope of the present invention. Accordingly, reference should be made to the claims to determine the scope of the present invention.

What is claimed is:

1. A portable welding unit, comprising:
   (a) a housing;
   (b) at least one sealed, non-spillable suspended-electrolyte battery located in the housing, the at least one battery having a positive terminal and a negative terminal, wherein the at least one battery can provide sufficient current to power a portable welder;
   (c) a ground clamp electrically connected to one of the positive and negative terminals of the at least one battery, the ground clamp extending outside the housing and adapted to be connected to a ground of an object to be welded;
   (d) a welding gun electrically connected to the other of the one of the positive and negative terminals of the at least one battery, the welding gun extending outside the housing; and
   (e) a wire feed mechanism located in the housing and connected to the battery for feeding wire through the welding gun.

2. The welding unit of claim 1, wherein first and a second sealed, non-spillable, suspended-electrolyte batteries, each having a positive and a negative terminal, are connected in series and located in the housing, with the ground clamp connected to the positive terminal of the first battery and the welding gun electrically connected to the negative terminal of the second battery.

3. The welding unit of claim 2, further comprising a recharging connection for recharging the first and second batteries.

4. The welding unit of claim 3, wherein the recharging connection is configured for charging at twelve volts.

5. The welding unit of claim 3, wherein the recharging connection is configured for charging at twenty-four volts.

6. The welding unit of claim 1, further comprising a battery monitoring circuit electrically connected to the at least one battery for determining the condition of the at least one battery.

7. The welding unit of claim 6, further comprising an output display connected to the battery monitoring circuit to visually indicate the condition of the battery.

8. The welding unit of claim 7, further comprising a tester button for enabling the user to determine the condition of the at least one battery, the tester button is located in the housing and is electrically connected to the battery monitoring circuit.

9. The welding unit of claim 6, wherein the at least one battery comprises a first battery and a second battery, and wherein the battery monitoring circuit is connected across the second battery.

10. The welding unit of claim 6, wherein the at least one battery comprises a first battery and a second battery, and wherein the battery monitoring circuit is connected across the first and second batteries.

11. The welding unit of claim 1, wherein the wire feed mechanism comprises
   (a) a drive motor;
   (b) grooved rollers powered by the drive motor and adapted to receive electrode wire; and
   (c) a drive motor control circuit connected to the at least one battery and the drive motor.

12. The welding unit of claim 11 wherein the drive motor has a gear reduction mechanism.

13. The welding unit of claim 12, wherein the drive motor is a variable speed motor.

14. The welding unit of claim 13, wherein the grooved roller has a wire tension adjustment.

15. The welding unit of claim 1, wherein the ground clamp is connected to the positive terminal of the at least one battery and the welding gun is connected to the negative terminal of the at least one battery, whereby the drive mechanism utilizes flux electrode wire.

16. The welding unit of claim 1, wherein the ground clamp is connected to the negative terminal of the at least one battery and the welding gun is connected to the positive terminal of the at least one battery, whereby the drive mechanism utilizes solid electrode wire.

17. A compact portable welding unit, comprising:
   (a) a housing having a width not greater than seven (7) inches, a length not greater than fifteen (15) inches, and a height not greater than fifteen and one-half (15½) inches;
   (b) at least one sealed, non-spillable battery, the battery having a positive and a negative terminal, the battery located in the housing, wherein the at least one battery can provide sufficient current to power a portable welder;
   (c) a ground clamp electrically connected to one of the positive and negative terminals of the battery, the first clamp extending outside the housing and adapted to be connected to a ground of an object to be welded;
   (d) a welding gun electrically connected to the other one of the positive and negative terminals of the battery, the welding gun extending outside the housing; and
   (e) a wire feed mechanism located in the housing and connected to the battery for feeding wire through the welding gun.

18. The welding unit of claim 17, wherein the width of the housing is between three and seven inches, inclusive.

19. The welding unit of claim 17, wherein the length of the housing is between six and fifteen inches, inclusive.

20. The welding unit of claim 17, wherein the height of the housing is between nine and fifteen inches, inclusive.

21. The welding unit of claim 17, wherein the unit comprises a first and a second sealed, non-spillable batteries connected in series, each battery having a positive and a negative terminal, the first and second batteries located in the housing, with the first clamp connected to the positive terminal of the first battery and the welding gun connected to the negative terminal of the second battery.

22. The welding unit of claim 17, further comprising a recharging connection for recharging the first and second batteries.

23. The welding unit of claim 20, wherein the recharging connection is configured for charging at twelve volts.

24. The welding unit of claim 20, wherein the recharging connection configured for charging at twenty-four volts.

25. The welding unit of claim 17, further comprising a battery monitoring circuit electrically connected to the at least one battery for determining the condition of the at least one battery.

26. The welding unit of claim 25, further comprising an output display connected to the battery monitoring circuit to visually indicate the condition of the battery.

27. The welding unit of claim 25, wherein the at least one battery comprises a first battery and a second battery, and wherein the battery monitoring circuit is connected across the second battery.

28. The welding unit of claim 25, wherein the at least one battery comprises a first battery and a second battery, and wherein the battery monitoring circuit is connected across the first and second batteries.

29. The welding unit of claim 17, wherein the at least one battery comprises a first battery and a second battery, and wherein each of the first and second batteries have the following dimensions: not greater than seven inches (7 inches) in height, not greater than seven and one-half inches (7½ inches) in length, and not greater than three inches in width (3 inches).

30. The welding unit of claim 29, wherein each of the first and second batteries may output up to seventeen (17) ampere hours.

31. The welding unit of claim 29, wherein each of the first and second batteries have the following dimensions: approximately 6.57 in height, approximately 7.13 inches in length, and approximately 3 inches in width.

32. The welding unit of claim 17, wherein the ground clamp is connected to the positive terminal of the at least one battery and the welding gun is connected to the negative terminal of the at least one battery, whereby the drive mechanism utilizes flux electrode wire.

33. The welding unit of claim 17, wherein the ground clamp is connected to the negative terminal of the at least one battery and the welding gun is connected to the positive terminal of the at least one battery, whereby the drive mechanism utilizes solid electrode wire.

34. A portable welding unit, comprising:
   (a) a housing;
   (b) at least one sealed, non-spillable, lead-calcium, rechargeable battery located in the housing, the at least one battery having a positive terminal and a negative terminal, wherein the at least one battery can provide sufficient current to power a portable welder;
   (c) a ground clamp electrically connected to one of the positive and negative terminals of the at least one battery, the ground clamp extending outside the housing and adapted to be connected to a ground of an object to be welded;
   (d) a welding gun electrically connected to the other of the one of the positive and negative terminals of the at least one battery, the welding gun extending outside the housing; and
   (e) a wire feed mechanism located in the housing and connected to the battery for feeding wire through the welding gun.

* * * * *